United States Patent Office 2,778,759
Patented Jan. 22, 1957

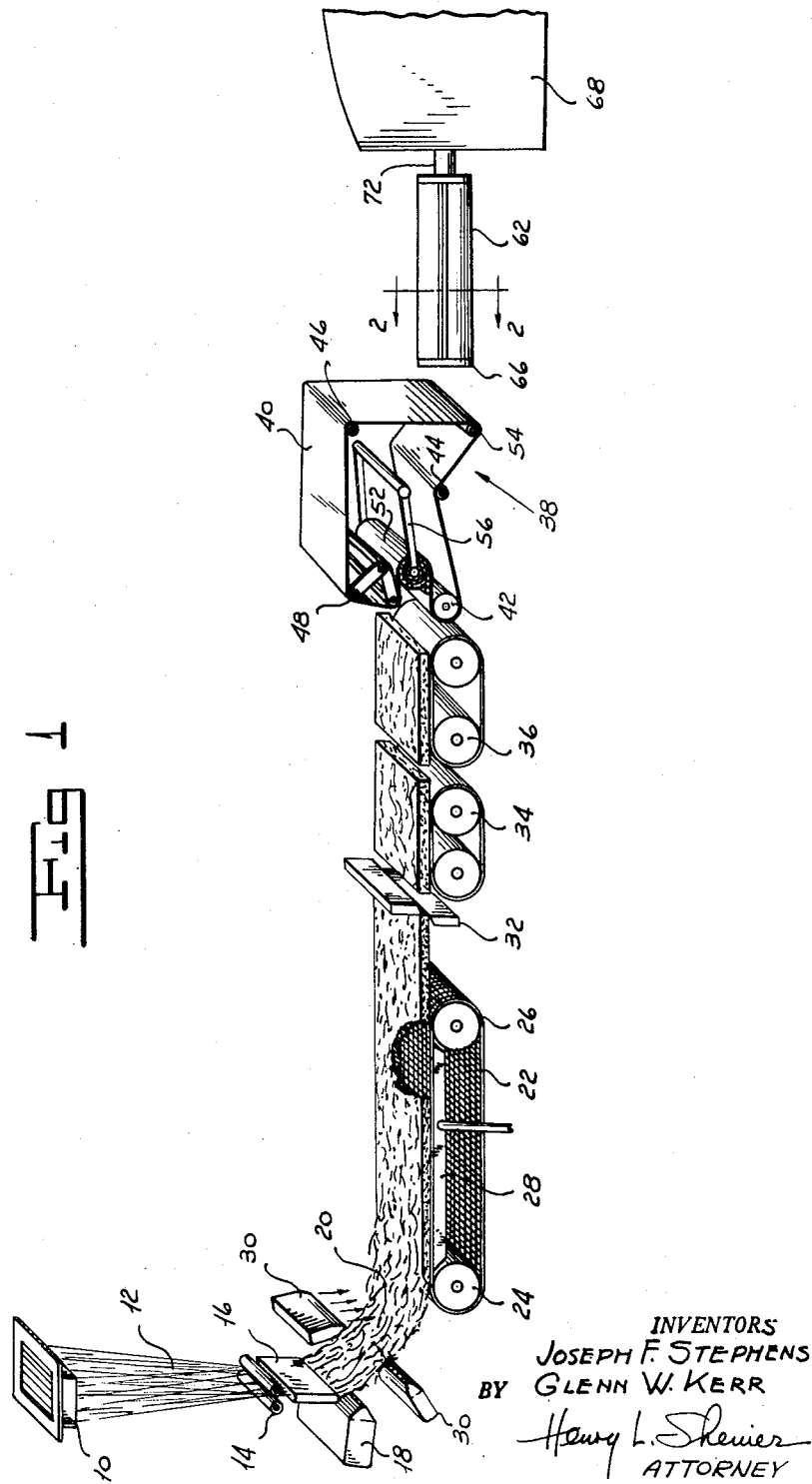

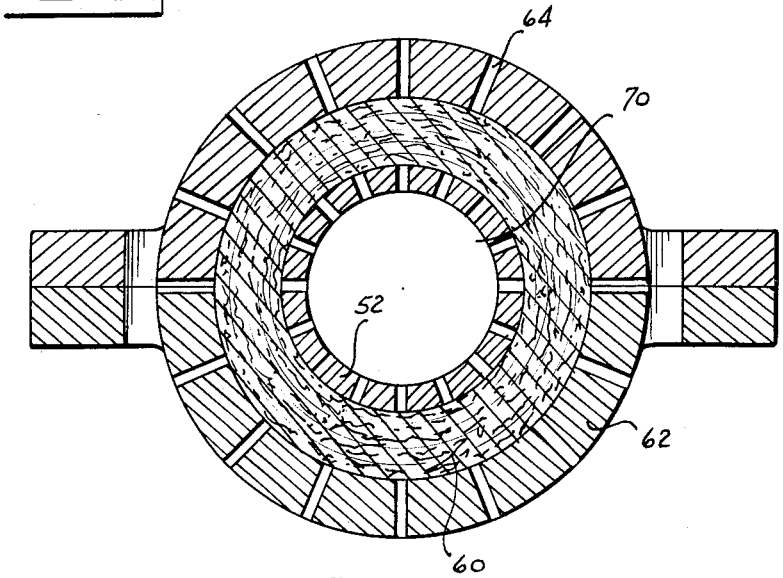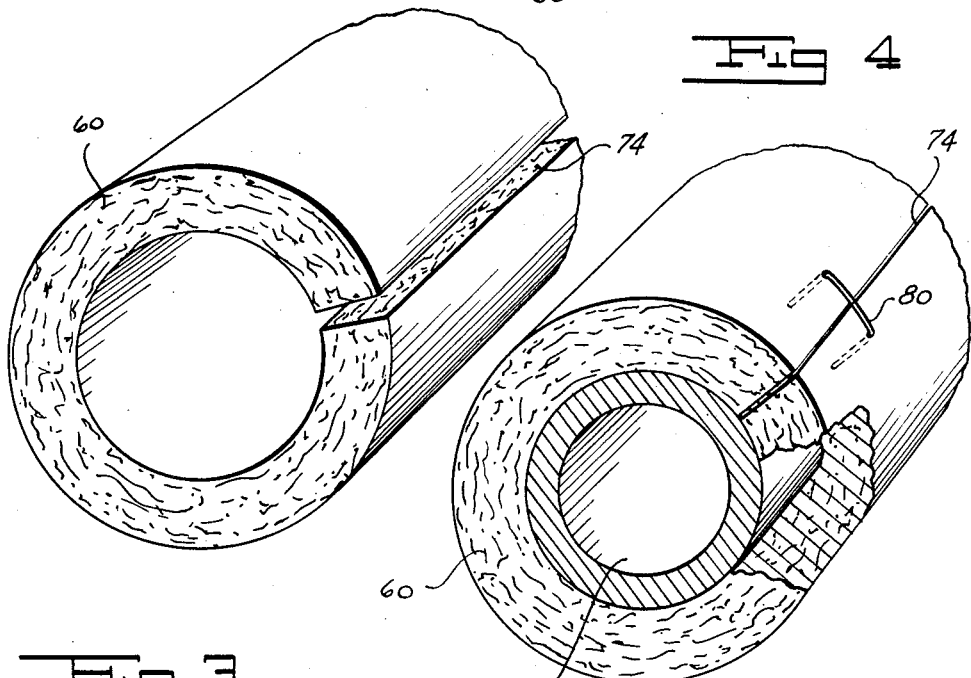

2,778,759

THERMAL PIPE INSULATION

Joseph F. Stephens, Kansas City, Mo., and Glenn W. Kerr, Mission, Kans., assignors to Gustin-Bacon Manufacturing Co., Kansas City, Mo., a corporation of Missouri Application November 5, 1952, Serial No. 318,856

7 Claims. (Cl. 154—44)

This invention relates to an improved pipe covering which is to be utilized as a thermal insulation, and a method for making the same, and more particularly to a covering so constructed as to give it such properties of resilience and shape retention as shall enable it to be placed around a pipe by springing apart the edges of a single longitudinal slit or opening without damage to its structure and to enable it when released to spring back to its original shape and to encircle and snugly engage the pipe.

Pipe coverings of the prior art fall in four general classes:

(1) Jacketed bulk or loosely integrated fibrous or granular material such as rock wool and unbonded glass wool.

(2) Flexible felts in mat or ribbon form, such as wool felt and hair felt.

(3) Fabricated forms, which are also rigid, such as corrugated asbestos paper and laminated asbestos felt with sponge particles between the layers.

(4) Molded and rigid, as exemplified by 85% magnesia—15% asbestos, granulated cork, rock wool, foamed glass, foamed plastic, and plastic bonded glass wool.

The fourth class is made and applied to the pipe in the form of two circumferential halves or hemi-cylinders. Commonly an envelope or jacket such as canvas or muslin is applied to the outer faces of a complementary pair of halves. This envelope serves to reinforce or protect the material, as well as to hinge the two rigid halves together across the meeting edges on one side, and to provide a flap or overlap across the meeting edges on the opposite side, which when secured by paste or other means serves to hold the two halves in place on the pipe. If such an envelope or jacket is not attached to the two rigid halves, an equivalent loose envelope is applied around the halves to secure them in place on the pipe. Rigid pipe coverings are of higher density, hence heavy, and this with the necessity of application in two halves makes installation laborious and costly. Furthermore, since both the outside diameter of the pipe to which the covering is to be applied and the inside diameter of the rigid form of pipe covering are subject to dimensional manufacturing tolerances, either a loose fit must be suffered on all pipe having a diameter below the maximum within tolerance, or if the inside diameter of the pipe covering be molded to less than the maximum within tolerance, say, at the nominal diameter of the pipe, then it will loosely fit any pipe having diameter below nominal and fail to completely close about pipe having diameter above nominal.

Since most efficient forms of rigid pipe covering are fragile, if the covering loosely fits the pipe, it is unsupported and vulnerable to imposed loads or blows. If the two halves do not completely close on the pipe, there is in the opening between the halves a source of considerable heat loss.

Pipe coverings of class 3 above are also rigid and cannot be appreciably deformed without breaking or delaminating, and hence are normally installed in two halves and secured in place by a means similar to that above described for the molded forms, or by means of metal bands which are cinched about the covering at suitable intervals. The laminated asbestos and sponge type is manufactured with a single slit or opening, and to enable it to be opened wide enough to receive the pipe, that is, to overcome its rigidity, it is customary to make a half slit 180 degrees opposite to the complete slit or opening, in order that opening the edges of the slit far enough to receive the pipe can be accomplished. Even when provided with such a half slit on the opposite interior face, the covering will break or delaminate in the vicinity of the hinge line and when placed about the pipe it does not return to anything like a substantially complete closure, but instead must be urged to such a closure and retained in abutting edge position.

Flexible felts or coverings of class 2 must be made to conform to the pipe and are held in place by retentive means since they do not possess of themselves retention of shape. The material is either wrapped about the pipe or helically wound about the pipe and is retained in place by securing envelopes or bands. Accordingly installation is laborious, slow and costly.

So also is the installation of jacketed porous pipe covering materials of class 1. Sheet metal, metal mesh, plastic, or paperboard envelopes or sleeves are required to bring the covering into position about the pipe and to retain the insulating material in place.

All of the pipe coverings of the prior art require considerable time and labor in application. Most of them are relatively heavy and fragile. Hence, they are easily broken in handling, in application, or in service. Their weight and fragility are such as to dictate their manufacture, and hence their installation, in lengths not in excess of three feet. Their rigidity is such that they must be applied in two halves and retained in place by supporting envelopes or sleeves, or if possessing a degree of flexibility sufficient to permit of their deformation to the extent of receiving a pipe through a single opening or slit, normally suffer impairment of structure and always must be urged back to a cylindrical shape and to a position encircling the pipe and retained there by a supplemental means such as envelopes, sleeves, or bands. All forms are difficult to cut to length or to fit, as in the case of mitered joints, without breaking, fraying, or delaminating the edges and areas adjacent to the cut.

One object of our invention is to provide a thermal insulation for pipes which has very high resistance to heat flow in proportion to its weight, which is not fragile or easily broken, and which can be easily and cleanly cut and parted.

Another object of our invention is to provide a pipe covering which is flexible, yet capable of retaining its cylindrical shape and of resiliently conforming to tolerance variations in pipe dimensions and to snugly fit the pipe.

Another object of our invention is to provide a resilient pipe insulation with a single longitudinal slit which may be distorted sufficiently at the slit to fit over a pipe having an outside diameter equal to the inside diameter of the insulation without delamination or breaking and which will return substantially to its original shape when fitted over the pipe.

Still another object of our invention is to provide a resilient dimensionally stable pipe insulation wherein the shape-retaining qualities result from the material rather than from a covering applied to the material.

Another object of our invention is to provide a pipe covering which when placed about the pipe will retain its concentric position thereabout without benefit of envelopes, sleeves, or bands, and having a surface texture that can be attractively and economically painted without employment of an auxiliary surfacing fabric or jacket.

A further object of our invention is to provide a pipe covering of hollow cylindrical form having a longitudinal slit or opening which can be easily spread apart to receive the pipe for which it has been dimensioned and to flex through its wall in being so spread without delaminating breaking, or otherwise suffering impairment of its structure, and further, which when released from the spread condition will snap back to encircle and snugly fit the pipe.

Still another object of our invention is to provide an insulating pipe covering that can be transported and applied without breakage, installed with ease and with considerable saving in time and in labor cost.

Another object of our invention is to provide an improved method of making our pipe insulation which will produce the properties that accomplish our objects of invention.

A further object of our invention is to provide a method of forming pipe insulation at proper and uniform density and in such a way as to interengage the fibers of adjacent layers so as to provide a structure that is homogeneous and which resists delamination.

Other and further objects of this invention will appear from the following description.

In general, our invention contemplates a thermal pipe insulation formed of glass fibers bonded with a binder and molded to cylindrical form by heat. The pipe insulations of the prior art which are formed with glass fibers bonded with a binder are of high density and possess little inherent resiliency or elasticity. Accordingly, they have been made of two semi-cylindrical sections which are adapted to be fitted about a pipe. We have discovered that by controlling the diameter of the glass fibers within predetermined limits, by controlling the weight of the binder with respect to the weight of the finished product within predetermined limits, and by controlling the density to which the material is compressed during the molding thereof, we can obtain an improved thermal pipe insulation having many remarkable properties.

A salient property of the material is its high thermal resistivity per pound of density. Another unique property of our thermal pipe insulation is its springiness or elasticity, enabling a split cylinder, in which form it is made, to be spread by separating its edges and then have the material spring back substantially to cylindrical form. In this manner lengths of pipe insulation can be rapidly and expeditiously applied to lengths of pipe. The split portion can, if desired, be secured by manually inserting staples or other fasteners at separated points across the slit. Additional fastening means are not necessary for retention of the pipe insulation on the pipe.

In the accompanying drawings which form part of the instant specification and which are to be read in conjunction therewith and in which like reference numerals are used to indicate like parts in the various views:

Figure 1 is a diagrammatic view showing the process of making our improved thermal insulation.

Figure 2 is a sectional view taken on the line 2—2 of Figure 1.

Figure 3 is a perspective view of a section of our improved pipe insulation showing its normal shape.

Figure 4 is a perspective view showing our pipe insulation in position around a pipe to be insulated.

More particularly, referring now to the drawings, molten glass is fed to an electrically heated bushing 10 from a molten glass tank (not shown). Primary glass fibers 12 are drawn from a plurality of orifices positioned at the bottom of the bushing 10 by drawing rolls 14. These fibers are pulled at a relatively low speed and are known as "primary fibers." These have diameters ranging between 250 and 600 microns. The primary fibers are passed through fiber guides 16 which serve to spread the fibers longitudinally and maintain them in a common plane. As the fibers emerge from the fiber guides 16, they are subjected to a high-temperature, high-velocity blast from a hot gaseous blast device 18. This device is known to the art and comprises a gas heater adapted to deliver gases at high temperature and a high velocity through a plurality of nozzles. The hot gases melt the primary fibers and produce ultra-fine secondary fibers 20. The velocity of the blast and the temperature of the hot gases are so controlled that the average fiber diameter of the ultra-fine fibers will not be greater than ten microns. It is to be understood, of course, that many fibers will have a thickness of less than a micron and that many fibers may be as thick as fourteen microns in diameter. The temperature of the gases and the velocity of the gas streams encountering the primary fibers emerging from the guides is so controlled that an average fiber diameter of no more than ten microns is achieved. We have found that an average diameter of four microns gives the most advantageous results. If the average diameter of the glass fibers exceeds ten microns, they will be too stiff and break under molding and the inherent resiliency which we seek will not be obtained. Furthermore, it appears that if the fibers have an average diameter of more than ten microns, they will tend to orient themselves longitudinally of the forming conveyor. As a consequence of this, the random distribution of fibers which we achieve and which is desirable does not occur and the improved results and remarkable properties of our improved thermal insulation will not be achieved. The fiber diameter is critical and an average diameter of not more than ten microns must be achieved to produce our improved thermal insulation. The fineness of the fiber does not appear to have any adverse effects. We may make the fibers as fine as we like. There is a tendency, however, if the fibers are made too fine to lose some of the spring strength which we desire. It appears that very fine fibers do not have the stiffness of fibers of larger diameter. The results are obtained, but the finished product tends to be somewhat too flabby. Furthermore, to form fibers having an average diameter of less than one and one-half microns requires a very high velocity air blast and a high temperature. We have found that the average optimum fiber diameter is about four microns and that the results accrue up to the vicinity of ten microns.

The fibers stream in the blast and fall to the surface of a forming conveyor 22 which may advantageously take the form of an endless belt of foraminous metal positioned upon rollers 24 and 26, one or both of which may be power driven. A vacuum box 28 is positioned underneath the foraminous belt to hold the mat of fibers upon the belt. While the ultra-fine glass fibers are being formed by the air blast, they are simultaneously sprayed with a binding material from a plurality of spray guns 30. This coats the glass fibers with a discontinuous coating of binding material. We have found that any of a number of heat-reactive plastics are appropriate for use in our process and in our thermal insulation. Phenol condensation products, melamine resins, urea-formaldehyde resins, urea-melamine resins, vinyl chloride acetate resins, or the like, may be advantageously employed. The rate of flow of the binder from the spray nozzles 30 must be carefully adjusted. We have found that the weight of the binder with respect to the weight of the finished product should lie between fifteen percent and thirty-five percent. Otherwise stated, the binder must be used to an extent of between about seventeen percent to about fifty-five percent by weight based on the weight of the glass filaments. If less than fifteen percent of binder, based on the weight of the finished product, is employed, the thermal insulation is too flabby and loses its resiliency and elasticity. Furthermore, it will delaminate, which apparently contributes to the loss of circumferential elasticity. If more than thirty-five percent, based on the weight of the finished insulation, of thermo-setting binder is employed, the finished product will become boardy and stiff and will lose its inherent circumferential resiliency, which is a salient distinguishing characteristic of our thermal insulation.

The turbulence of the air blast is such that, together with the fineness of the fibers, a considerable percentage of them will lie in various directions. Otherwise stated, the fiber orientation in the mat upon the forming conveyor 22 will be random. If the average fiber diameter exceeds the ten microns, the orientation appears to be generally longitudinally of the conveyor for the most part. Stated otherwise, if the average fiber diameter exceeds ten microns, the orientation of the fibers of the mat upon the forming conveyor will be less random and an average small percentage of the fibers will lie generally perpendicular to the surface of the belt and transverse thereto. The random orientation of the fibers appears to be critical, and this in turn in part is a function of the fiber diameter.

The mat formed of the secondary fibers in combination with the thermo-setting binder is then sheared by shears 32. The mat is then conveyed by delivery conveyor 34, which is operated at the speed of the forming conveyor 22, to a second conveyor 36, which is operated at the speed of the winder, which is indicated generally by the reference numeral 38. The winder comprises an endless belt 40 which is driven from a driving roll 42 around idler rollers 44, 46, 48 and 50. Roller 52 is the mandrel upon which the mat is wound upon itself while in "green" or uncured form. Roller 54 is a tensioning roller adapted to maintain a predetermined tension upon the cylinder of uncured mat being wound upon the mandrel 52. The mandrel 52 is hollow and perforated, and the wound up mat 60 adheres to the mandrel due to the sticky nature of the green binder. The mandrel 52 with the mat wound in cylindrical form thereabout is removed from the winding step by the carrying arms 56 upon which the mandrel 52 is rotatably mounted and placed in a mold 62, which is formed of two halves and provided with a plurality of perforations 64 formed circumferentially therearound. By reference to Figure 2 it will be seen that the uncured mat in cylindrical form is positioned between the perforated mandrel 52 and the perforated mold 62. The mold is closed by appropriate fastener means (not shown). The mold volume is carefully determined to give the proper density to the finished product. We have found that the density of our thermal insulation must lie between two and five pounds per cubic foot. If the density is less than two pounds per cubic foot, the material is too flabby and does not have sufficient resiliency and elasticity to spring back to substantially cylindrical form when opened and applied to a pipe. If the material is made with less than two pounds per cubic foot, therefore, a salient feature and advantage of our invention is lost. If the density exceeds five pounds per cubic foot, the advantageous results and properties of our thermal insulation are also lost as the material loses flexibility. If it is attempted to move the edges of a split cylinder of thermal insulation having a density greater than five pounds per cubic foot it becomes difficult to open and apply about the pipe and subject to delamination and breakage. Accordingly, it does not have the desired flexibility. The optimum density lies in the vicinity of three pounds per cubic foot. In this range of density our material has superior elasticity and resiliency and all the advantages of our improved thermal insulation in a marked degree.

After the uncured mat in cylindrical form is placed in the mold, one end of the assembly is closed by an appropriate closure 66. Hot gases from a gas-fired oven 68 are fed to the interior 70 of the mandrel 52 through an appropriate conduit 72. The hot gases set the resin, drive off the resulting moisture and cure the covering. The curing can take place in any appropriate oven, but the curing step will then take much longer. With our perforated mandrel and mold we can cure a phenol formaldehyde binder in approximately five minutes with a hot gas at 450° F. for a pipe covering having a four-inch interior diameter and a wall thickness of one inch.

After the cylinder of our improved thermal insulation is cured, it is allowed to cool and is then removed from the mold. During the removing step or after, a longitudinal slit 74 is cut along the cylinder of insulation. It is to be understood, of course, that the longitudinal slit may extend radially or, if desired, at an angle thereto, which permits of its removal from the mandrel. Stated differently, the slit may be cut to form a butt or a lap joint. The finished thermal pipe insulation will have surprising inherent resiliency. It can be opened to beyond its internal diameter lengthwise of the slit and placed diametrically across a length of pipe 76 to which the insulation is to be applied. It will be found that the insulation will spring back to substantially cylindrical shape as shown in Figure 3. It can be secured very simply and expeditiously by pressing U-shaped staples 80 to bridge the slit 74. The insulation, being of comparatively low density, is easy to handle. It is not frangible and will withstand considerable abuse. It can be walked upon or dropped without adverse effects. Its dimensional stability is an outstanding feature and is of tremendous advantage when applying the insulation. One of the products of the prior art is composed of glass fibers bonded with a plastic binder. The density of this material, however, is six pounds per cubic foot. The average fiber diameter is in excess of eleven microns. This material is "punky" and friable. It is formed in two halves, each having a generally semi-cylindrical form. It requires at least two people to apply it even in the three-foot lengths in which it comes, and binding means must be employed to secure it in place. Its rigidity is such that any bending or flexing will cause it to break. Our improved pipe covering can be readily cut with a pen knife either to length or to other shapes, such as might be encountered in accommodating to joints and fittings. No envelope or securing means other than the staples or the like, which may be easily pressed into place, are required.

The physical advantages of our improved thermal insulation can readily be appreciated by those skilled in the art, especially with reference to the ease of handling and application. The thermal properties, however, of our insulation are remarkable. In the following table there is listed the density, the thermal conductivity, the thermal resistivity, and the thermal resistivity per pound of density of the various thermal insulations of the prior art as compared with our thermal pipe insulation:

| | Density (pounds per cubic foot) | (k) Thermal conductivity at 100° F. Mean | (1/k) Thermal resistivity | Thermal resistivity per pound of Density |
|---|---|---|---|---|
| Diatomaceous Silica type | 27 | .63 | 1.59 | .059 |
| Laminated Asbestos Felt | 34 | .39 | 2.56 | .075 |
| Corrugated Asbestos type | 12 | .57 | 1.75 | .146 |
| 85% Magnesia, 15% Asbestos | 13 | .39 | 2.56 | .197 |
| Mineral Wool | 13 | .40 | 2.50 | .192 |
| Asbestos Reinforced Calcium Silicate | 11 | .41 | 2.44 | .222 |
| Glass Wool-resin Semi-cylinders | 6 | .25 | 4.00 | .667 |
| Stephens et al | 3 | .24 | 4.17 | 1.39 |

In the above table the corrugated asbestos was 4-ply and is a well-known pipe covering composed of alternate layers of corrugated and plain asbestos paper.

It will be noted that our thermal insulation has a higher thermal resistivity than any of the well-known thermal insulation materials of the prior art. Thermal resistivity is the reciprocal of thermal conductivity, known to the art as "k." "k" is defined as the time rate of heat flow through a homogeneous material under steady conditions through unit area per unit temperature gradient in the direction perpendicular to the area. Its value is expressed in B. t. u. per (hour) (square foot) (Fahrenheit degree per inch of thickness). Materials are considered homogeneous when the value of k is not affected by variation in thickness or size of sample within the range normally used in construction. While it was anticipated that our material would have a high thermal resistivity, it could not be expected that its resistivity per pound of density would be more than twice that of other glass wool plastic-bonded materials.

Our thermal insulation, as will be understood by those skilled in the art, cannot be employed at temperatures in excess of those which deteriorate the binder. For high-temperature use laminated asbestos felt, which is formed of a plurality of layers of asbestos with sponge particles between layers, and the diatomaceous silica types are usually employed. For temperatures involved with low-pressure steam and hot and cold water and for all low-temperature applications, our thermal insulation appears to be extremely advantageous. Our improved thermal insulation is non-hygroscopic and will retain its advantageous properties under high-humidity conditions.

It will be seen that we have accomplished the objects of our invention. We have provided an improved thermal pipe insulation which is light in weight and has a high thermal resistivity. It is easy to handle and to apply to pipes which can be quickly and expeditiously covered by a single workman. We have provided a thermal pipe insulation formed of a single split cylinder which can be spread and slid diametrically over the pipe to be insulated. It is quickly and easily secured in place by manually pressing U-shaped staples or the like across the slit. Our thermal insulation will stand considerable abuse and retain its dimensional stability. It can be dropped or stepped on without adverse effect. It can be readily cut with a pen knife. Due to its lightness, it can be made in lengths greater than three feet, which further augments its ease and speed of application. We have provided a thermal insulation for pipes which has a very high resistance to heat flow in proportion to its weight and which is not frangible or easily broken. We have provided a flexible pipe covering which is capable of retaining its cylindrical shape and of resiliently conforming to tolerance variations in pipe dimensions while fitting snugly around the pipe. We have provided a pipe covering which is resiliently dimensionally stable thus enabling it to be applied around a pipe concentrically without the aid of envelopes, sleeves or bands and which has a surface texture which can be attractively and economically painted without the employment of an auxiliary surfacing fabric or jacket. Our pipe insulation can be transported and applied without breakage and installed with ease in difficult locations at considerable saving in time and labor costs. We have provided an improved method of making pipe insulation which will produce a pipe covering having the advantageous properties hereinbefore set forth. Our improved method of forming pipe insulation will produce insulation of proper and uniform density of glass fibers disposed generally at random and provide a structure which is homogeneous and which resists delamination.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A single piece, preformed, resilient, thermal pipe insulation formed of glass fibers having an average diameter of less than ten microns bonded with a binder in an amount between fifteen percent and thirty-five percent by weight based on the weight of the thermal insulation and having a density between two pounds and five pounds per cubic foot, said insulation being formed generally in the shape of a hollow cylinder having an axially extending slit, said thermal pipe insulation being adapted to spring back to substantially its preformed shape when released after being deflected along the axially extending slit.

2. A single piece, preformed, resilient, thermal pipe insulation formed of glass fibers having an average diameter of less than ten microns coated with a thermo-setting resin in an amount between seventeen percent and fifty-five percent by weight based on the weight of the glass fibers and having a density between two pounds and five pounds per cubic foot, said insulation being formed generally in the shape of a hollow cylinder having an axially extending slit, said thermal pipe insulation being adapted to spring back to substantially its preformed shape when released after being deflected along the axially extending slit.

3. A single piece, preformed, resilient, thermal pipe insulation formed of glass fibers having an average diameter of about four microns, said filaments being oriented at random and being held in said random orientation by a binder in an amount between fifteen percent and thirty-five percent by weight based on the weight of the thermal insulation, said pipe insulation having a density between two pounds and five pounds per cubic foot and being formed generally in the shape of a hollow cylinder having an axially extending slit, said thermal pipe insulation being adapted to spring back to substantially its preformed shape when released after being deflected along the axially extending slit.

4. A single piece, preformed, resilient, thermal pipe insulation formed of glass fibers having an average diameter of less than ten microns, said fibers having deposited thereon a binder in an amount of about twenty-five percent by weight of the thermal insulation, said thermal insulation having a density between two pounds and five pounds per cubic foot and being formed generally in the shape of a hollow cylinder having an axially extending slit, said thermal pipe insulation being adapted to spring back to substantially its preformed shape when released after being deflected along the axially extending slit.

5. A single piece, preformed, resilient, thermal pipe insulation formed of glass fibers having an average diameter of less than ten microns, said fibers having deposited thereon a binder in an amount between fifteen percent and thirty-five percent by weight of the thermal insulation and having a density of about three pounds per cubic foot, said insulation being formed generally in the shape of a hollow cylinder having an axially extending slit and having a $k$ value of not more than .25 at 100° F. mean temperature, said thermal pipe insulation being adapted to spring back to substantially its preformed shape when released after being deflected along the axially extending slit.

6. A single piece, preformed, resilient, thermal pipe insulation having generally the shape of a hollow cylinder provided with an axially extending slit, said pipe insulation being formed of glass fibers having an average diameter of about four microns, said glass fibers being deposited at random orientation and held in such random orientation by a binder within the amounts of seventeen percent to fifty-five percent by weight based on the weight of the glass fibers, having a density of about three pounds per cubic foot and a $k$ value of not more than .25 at 100° F. mean temperature, said thermal pipe insulation being adapted to spring back to substantially its preformed shape when released after being deflected along the axially extending slit.

7. A single piece, preformed, resilient, thermal pipe insulation formed of glass fibers having an average diameter of about four microns and deposited in random orientation, said fibers being held in such orientation by a binder in an amount of about thirty-five percent by weight based on the weight of the glass fibers, said insulation being formed generally in the shape of a hollow cylinder adapted to be cut with an axially extending slit and having a density of about three pounds per cubic foot and a thermal resistivity of not less than 4 at 100° F. mean temperature, said thermal pipe insulation being adapted to spring back to substantially its preformed shape when released after being deflected along the axially extending slit.

References Cited in the file of this patent

UNITED STATES PATENTS

| | | |
|---|---|---|
| 289,455 | Seymour | Dec. 4, 1883 |
| 2,160,009 | Walker | May 30, 1939 |
| 2,288,072 | Collins | June 20, 1942 |
| 2,331,146 | Slayter | Oct. 5, 1943 |
| 2,350,996 | Atkinson et al. | June 13, 1944 |
| 2,489,242 | Slayter et al. | Nov. 22, 1949 |
| 2,600,843 | Bush | June 17, 1952 |
| 2,607,075 | Stalego | Aug. 19, 1952 |
| 2,625,263 | Kice | Jan. 13, 1953 |